United States Patent [19]

Blau

[11] Patent Number: 5,461,227

[45] Date of Patent: Oct. 24, 1995

[54] OPTICAL SENSING ARRAYS EMPLOYING MISALIGNED SQUINT OPTICAL ONES WITH OFFSET EMITTERS AND DETECTORS COMPARED TO ALIGNED AXES

[75] Inventor: David Blau, Cupertino, Calif.

[73] Assignee: Scientific Technologies Incorporated, Hayward, Calif.

[21] Appl. No.: 195,499

[22] Filed: Feb. 14, 1994

Related U.S. Application Data

[63] Continuation-in-part of Ser. No. 168,717, Dec. 16, 1993, Pat. No. 5,393,973.

[51] Int. Cl.[6] ........................................ G01V 9/04
[52] U.S. Cl. ...................... 250/221; 250/222.1; 340/556
[58] Field of Search ............................ 250/221, 222.1; 340/555, 556, 557

[56] References Cited

U.S. PATENT DOCUMENTS

| | | | |
|---|---|---|---|
| 3,746,863 | 7/1973 | Pronovost | 250/208 |
| 4,198,623 | 4/1980 | Misek et al. | 340/365 JP |
| 4,266,124 | 5/1981 | Weber | 250/221 |
| 4,742,337 | 5/1988 | Haag | 340/556 |
| 5,015,840 | 5/1991 | Blau | 250/221 |
| 5,243,183 | 9/1993 | Barron, Jr. et al. | 250/222.1 |
| 5,266,793 | 11/1993 | Smith | 250/214 A |

Primary Examiner—Edward P. Westin
Assistant Examiner—Steven L. Nichols
Attorney, Agent, or Firm—Flehr, Hohbach, Test, Albritton & Herbert

[57] ABSTRACT

An optical sensing array and method of operation for controlling the acceptance angle of light beams which are iteratively strobed in side-by-side channels between light transmitters and light receivers. In one embodiment, the light beams in at least a pair of channels are directed along axes which are intentionally mispointed or squinted. A control circuit measures the amplitudes of signals produced responsive to light being received by the light receivers and compares the ratio of those amplitudes to the ratio of predetermined high and low amplitude values which provide a threshold window. When the ratio of the signal amplitudes exceeds the ratio of the window threshold values, an output signal is produced indicative of an unsafe operating condition. The control circuit further maintains the gain of the signals from the light receivers to stay within the range of the predetermined window threshold values. In another embodiment, the light transmitter and receiver in at least one channel are offset in opposite directions from an optical axis of the channel for producing a narrow beam angle.

6 Claims, 7 Drawing Sheets

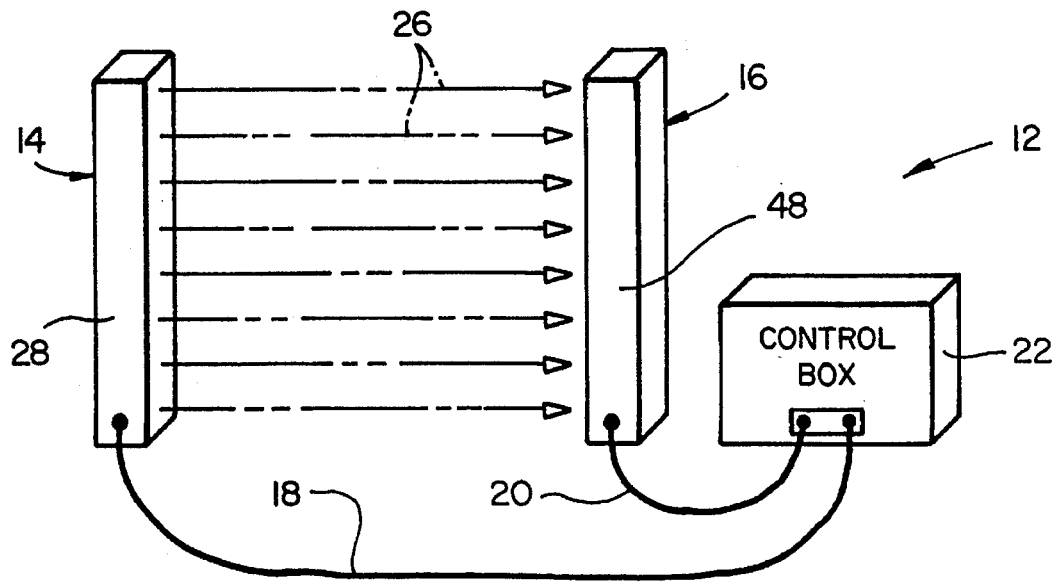
FIG_1
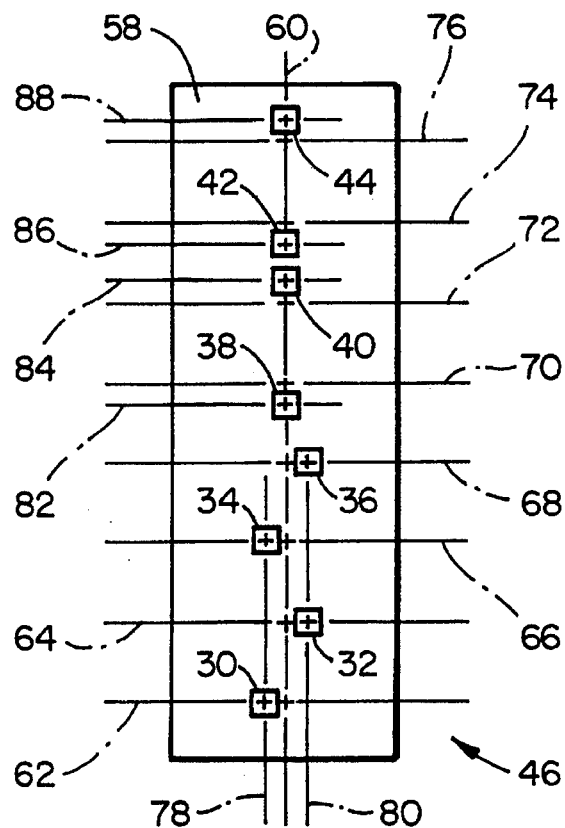
FIG_2

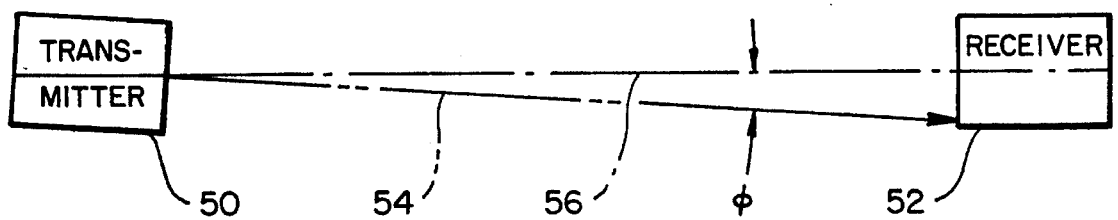
FIG_3
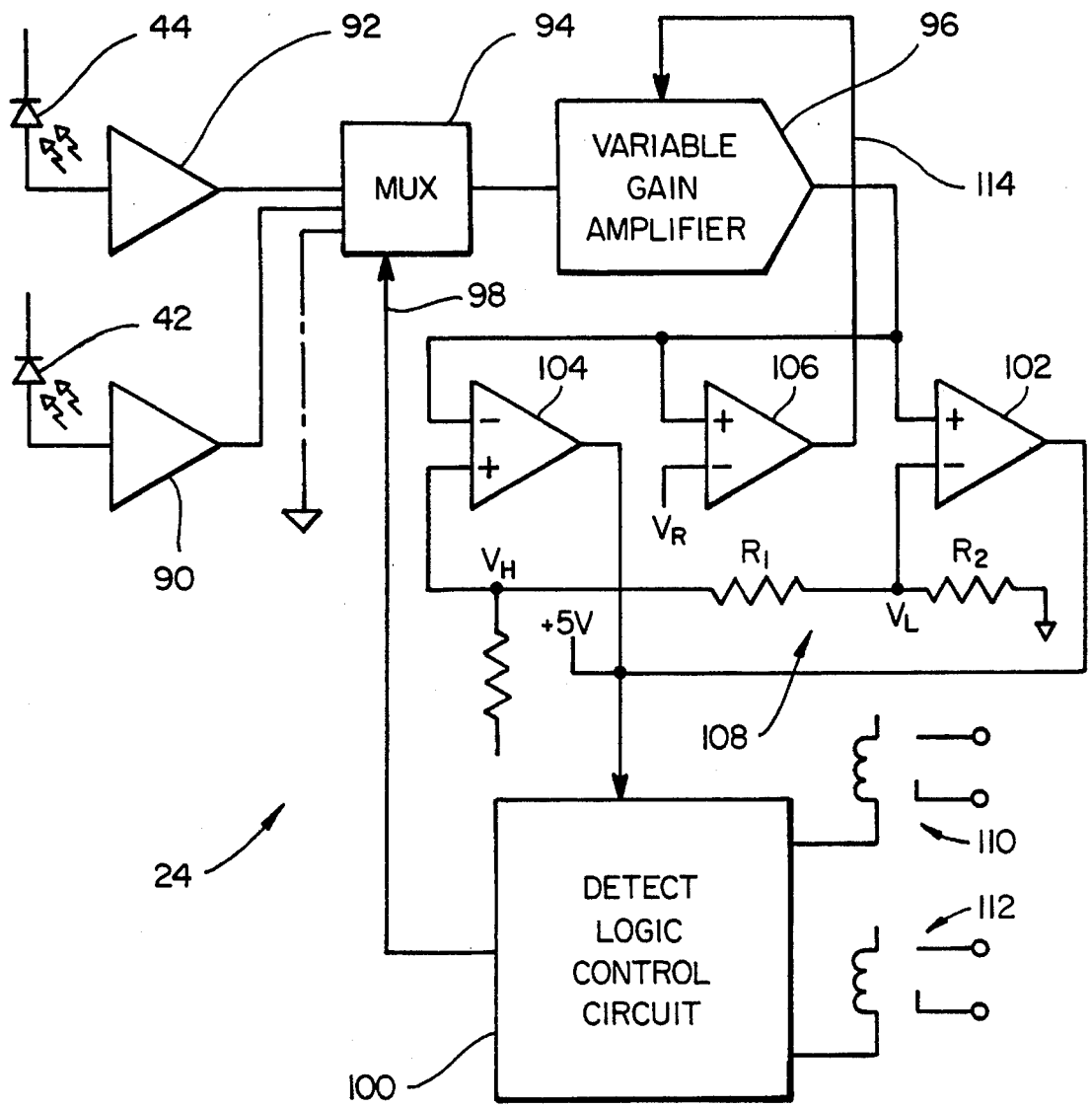
FIG_4

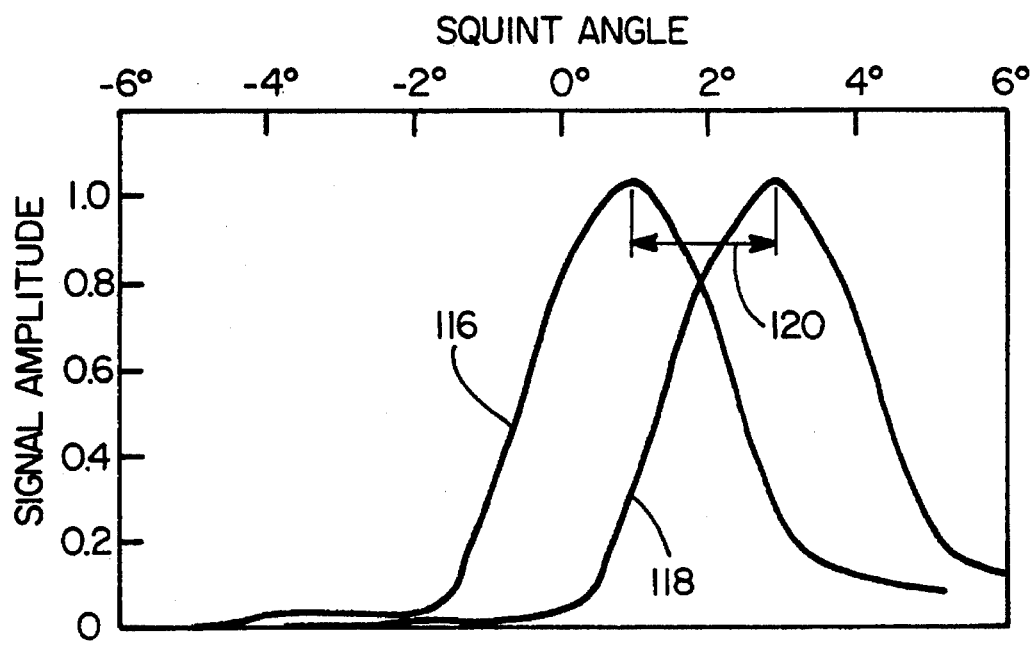
FIG_5
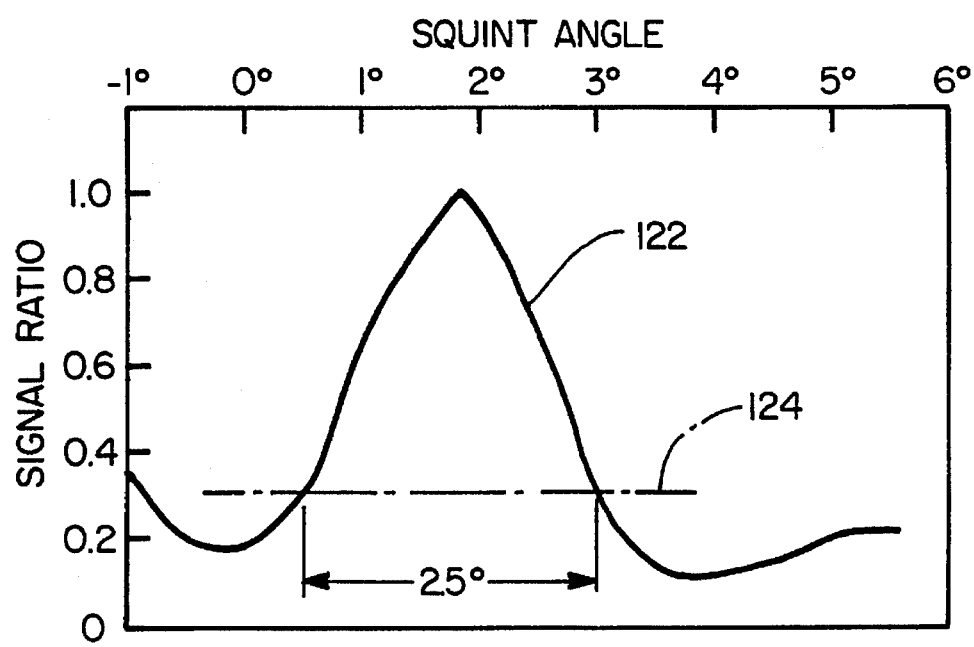
FIG_6

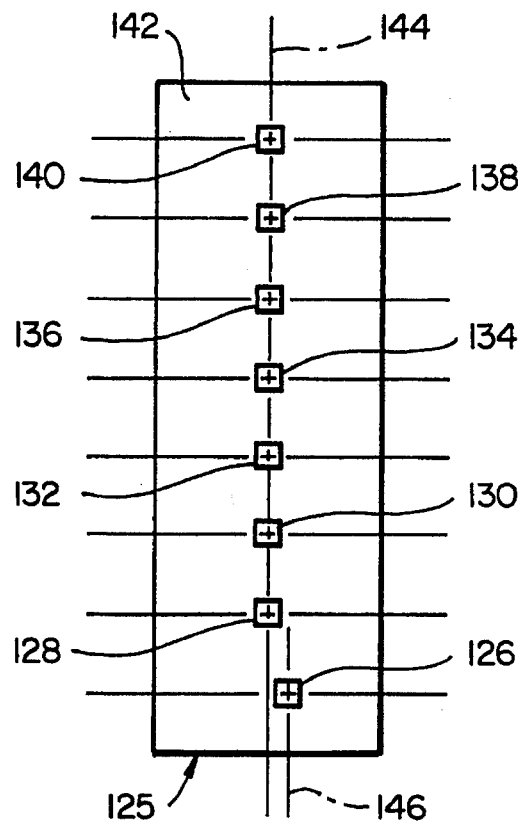
FIG_7
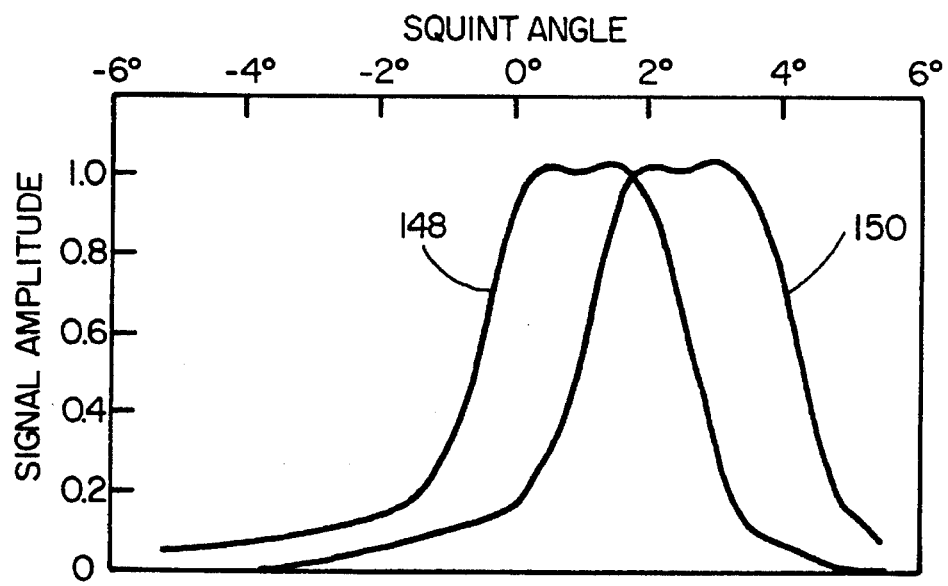
FIG_8

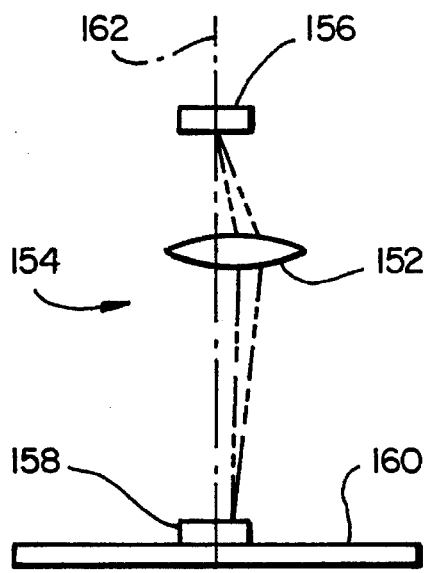
FIG_9
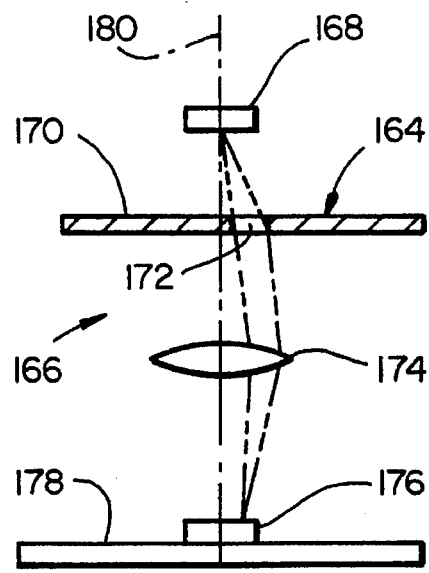
FIG_10
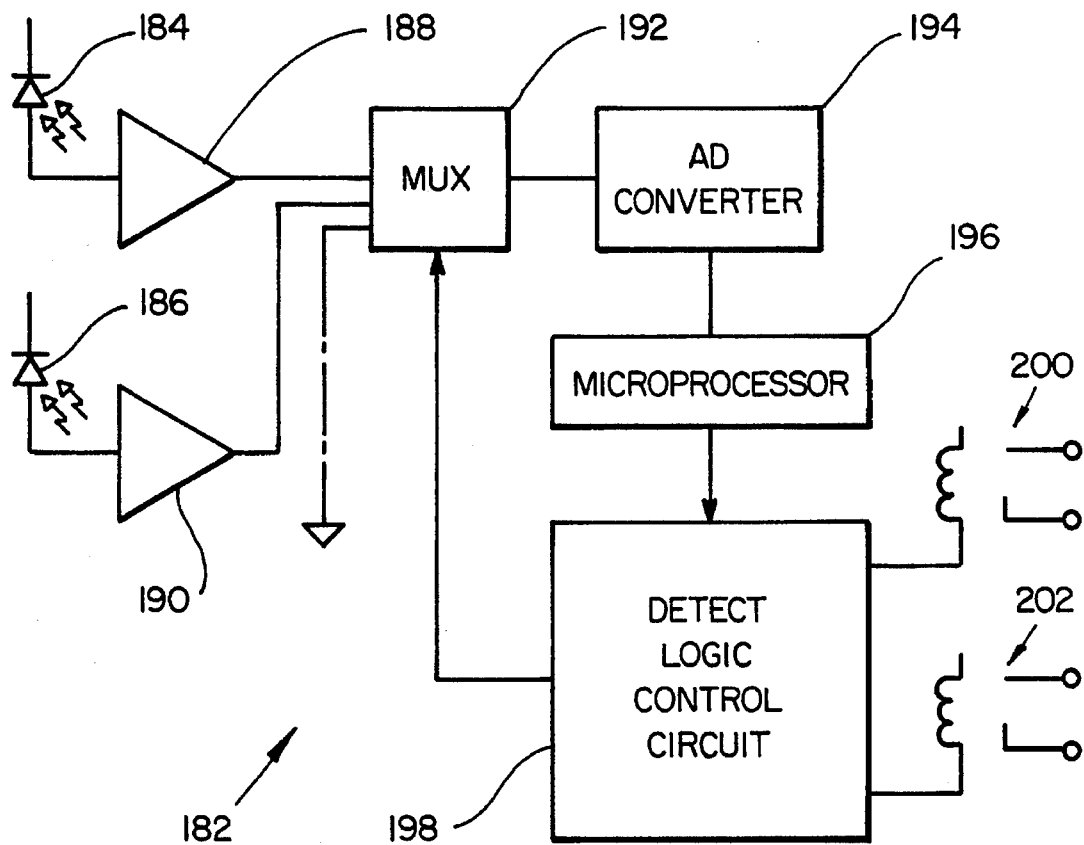
FIG_11

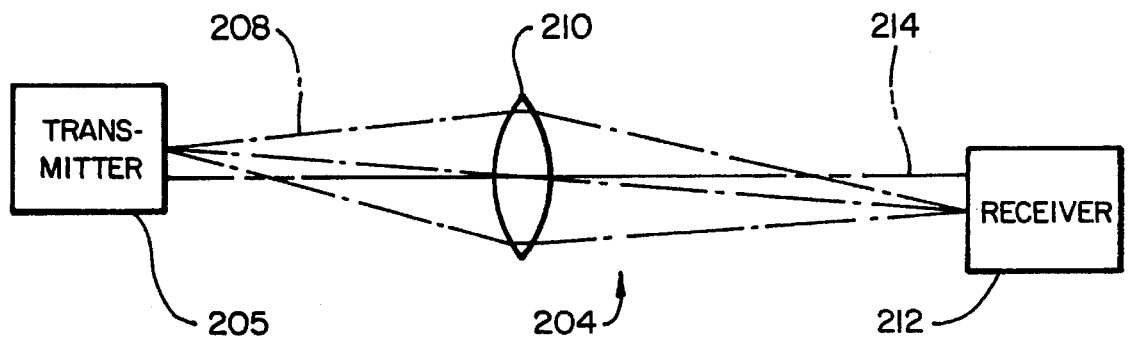
FIG_12
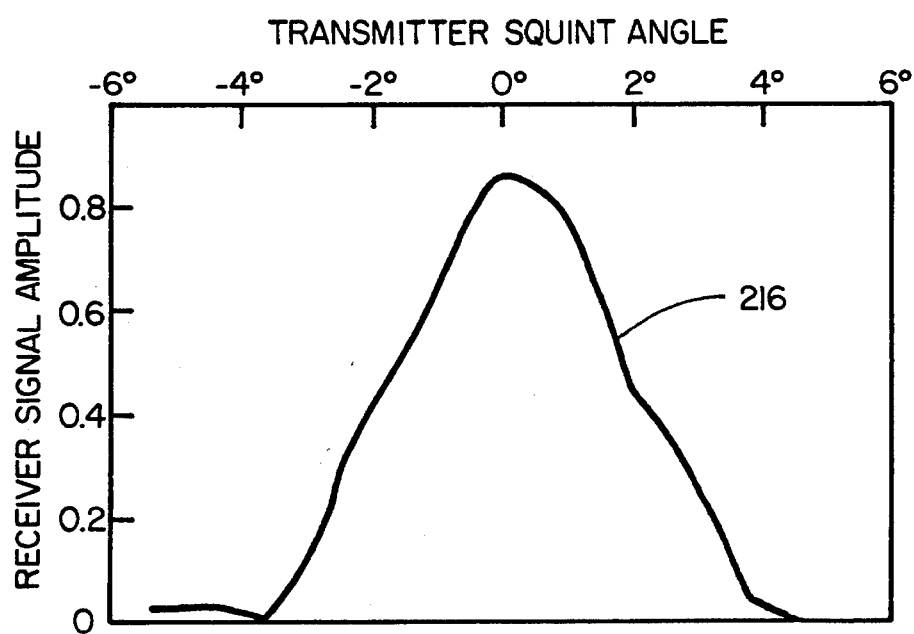
FIG_13

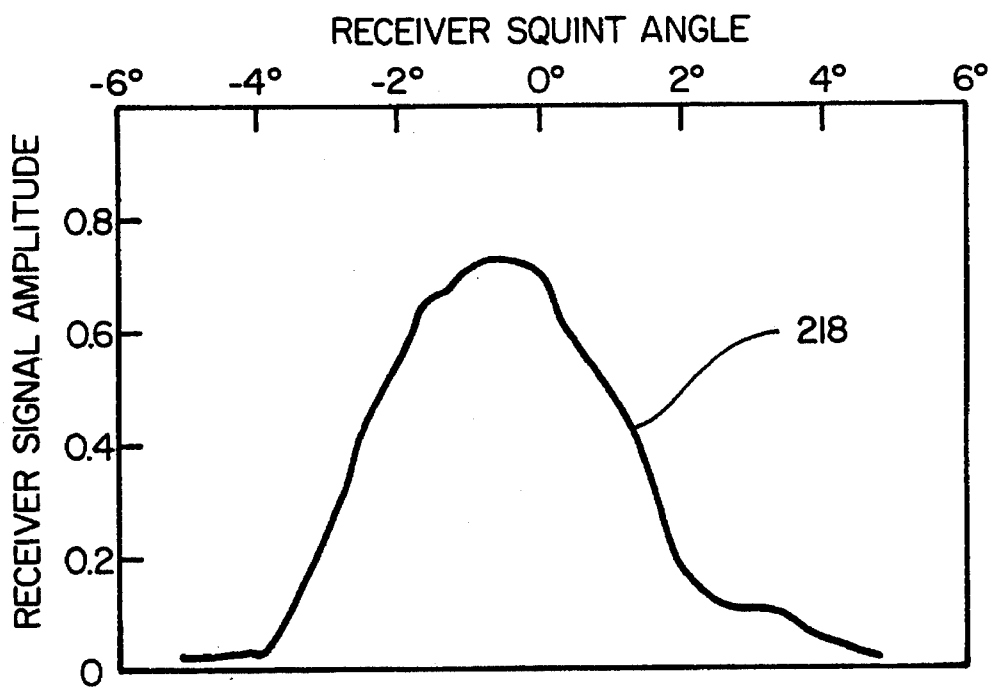
FIG_14
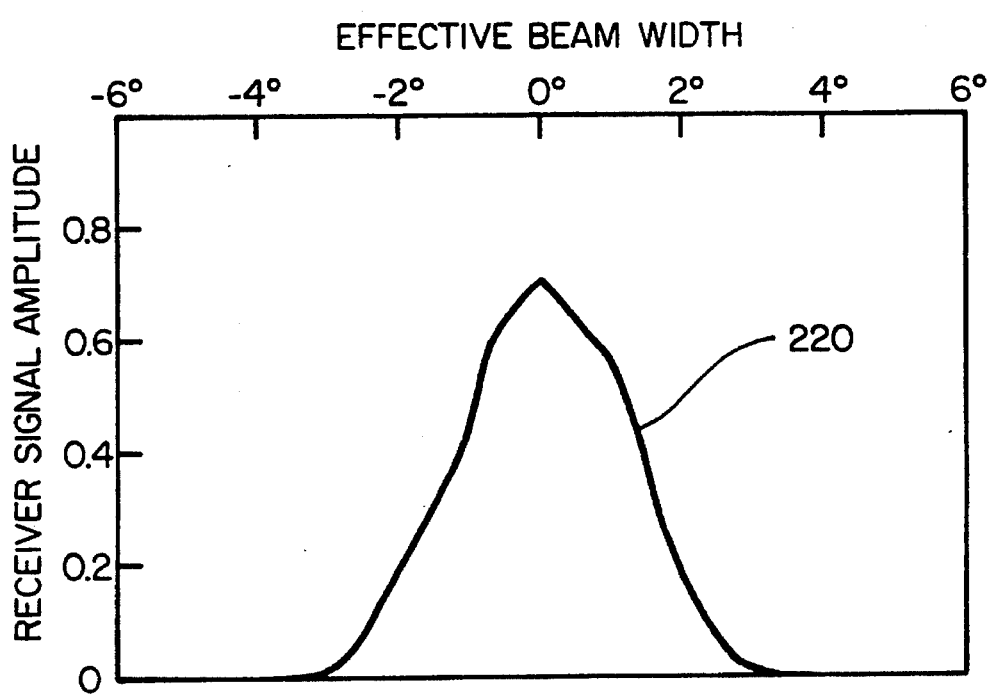
FIG_15

OPTICAL SENSING ARRAYS EMPLOYING MISALIGNED SQUINT OPTICAL ONES WITH OFFSET EMITTERS AND DETECTORS COMPARED TO ALIGNED AXES

CROSS REFERENCE TO RELATED APPLICATION

This is a continuation-in-part of application Ser. No. 08/168,717 filed Dec. 16, 1993, U.S. Pat. No. 5,393,973.

BACKGROUND OF THE INVENTION

1. Field of the Invention

This invention relates in general to optical sensing arrays for detecting the movement or intrusion of objects into guarded zones. More particularly the invention relates to optical sensing arrays such as light curtains of the type that provide protection for human operators who are working with machines and other industrial equipment.

2. Description of the Related Art

Optical sensing arrays such as light curtains employ infrared beams to provide operator safety in a variety of industrial applications. The optical sensing arrays typically are employed for operator protection around machinery such as punch presses, brakes, molding machines, automatic assembly equipment, coil winding machinery, robot operation, casting operations and the like. The systems employ light transmitters having light emitting diodes that are mounted at spaced positions along one side of the guard zone together with light receivers mounted at the opposite side of the zone. Modulated infrared light beams are strobed along separate parallel channels toward the light receivers. When the beams are blocked by penetration of an opaque object, such as the operator's arm, the control system shuts the machinery down, prevents the machine from cycling or otherwise safeguards the operator from injury, or the machine and/or work piece from damage.

With many light curtains the beams which are strobed have relatively wide cross sections and/or they tend to spread apart toward the light receiver. In such cases foreign objects that approach nearby the optical axis can reflect portions of the beam. Light can be reflected by the foreign objects back along the optical axis into the light receiver. This spurious light reflection can then produce a false light-detected signal such that the control would not properly safe-out the light curtain to indicate a blockage or unsafe condition. Such an unsafe condition can lead to injury to personnel or damage to equipment.

In light curtains and other similar optical sensing arrays it is desirable to control the maximum angle of acceptance, which is the maximum angle between the transmitted light beam and the light receiver element at which the system can be expected to properly operate. Relatively large angles of acceptance are undesirable in light curtains because they make it more difficult for the control system to properly discriminate between signals from the light beams and signals from spurious or transient sources such as light reflections from the work piece or surrounding environment. Such conditions could cause the control system to detect the spurious light and produce a false signal that the light beams are unbroken when in fact objects are penetrating the guarded zone. This is a highly unsafe condition in that the light curtain system would then not properly shut down or safeguard the area when the person's arm or other object penetrates through the light beams.

Safety laws and regulations in many states and countries are in effect or have been proposed requiring that light curtain systems, before they can be certified for sale and use, meet certain minimum criteria for angle of acceptance accuracy. Typically the maximum allowed acceptance angles have been on the order of 4° full angle. Many countries in Europe now require that the angular accuracy for light curtains be no more than 2½°, and Australia requires that the angular accuracy be no more than 2°.

In prior art light curtains the light beams are detected by light receivers, typically phototransistors (PT's) in a circuit which converts amplitude of the incident light beam into a voltage signal. With the light beam properly aligned on the optical axis of the PT, the detected signal is generally at its strongest. Misalignment of the light beam from that optical axis, such as from displacement of either the light transmitter or light receiver, causes a drop off in signal strength as a function of the misalignment angle. Where the light transmitter and receiver bars are maintained apart at a known distance then the displacement angle of the light beam from the PT's optical axis can be roughly measured as a function of signal strength. However, the absolute signal strength also varies as a function of the square of the distance range between the transmitter and receiver. For example, when the range varies from one foot to 300 feet then the signal would vary over the range from about 100,000 to 1. Electronic control circuits relying upon absolute signal strength would not be able to discriminate between transmitter and receiver bars which are far apart and properly pointed, and those that are very close together and mispointed because the signal strength in both cases could be the same. This can lead to conditions in which the light curtain does not properly safeguard the area. For example, a light curtain in which the transmitter and receiver bars are mispointed beyond the maximum 4° limit but at close range could only have a signal attenuation of 1,000 to 1. Absolute signal strength is thus not a good measure of light beam angular accuracy.

In the prior art, one conventional arrangement for controlling angular accuracy of light beams is through the use of high quality optics utilizing collimating lenses to focus the beam with the LED in the focal plane of the lens system. However, it is difficult to maintain sharp edges on the beams because of built-in features associated with the LED's, such as bond wires and epoxy, variations in emissions across the face of the LED surface, dirt on the LED surface, focusing problems and the like. The problem is exacerbated when a large number, which can be on the order of one hundred twenty, of the LED's are mounted on a single transmitter bar. The result is that small angles of mispointing of the beam to the PT's optical axis gives relatively small signal attenuation. For example, at a mispointing angle of 2½° the attenuation is on the order of 30%. This is very small in relation to the 100,000 to 1 attenuation that can be expected where the distance between the transmitter and receiver bars can range from one to 300 feet. Therefore a circuit which uses the attenuation edge of the signal amplitude to determine beam angle is an unreliable method for controlling angular accuracy in light curtains.

The prior art systems employing high quality optics with large and precise lenses do not provide a satisfactory solution to the foregoing problem for a number of reasons. Any minor defects in the lenses produce softness on the edges of the light beams, which limits the use of signal attenuation for determining angular accuracy. The problem is exacerbated as a result of the trend in the industry to produce smaller light curtain products in which the transmitter and receiver elements are mounted close together such that the larger collimating lenses cannot be employed. In certain of these small size light curtains the dies of the PT's and LED's are mounted directly on the printed circuit (PC) boards of the light transmitter and receiver bars. In these arrangements any misalignment of the transmitter or receiver bars moves all of the respective PT's or LED's so that all would be misaligned, thereby compounding the problem of controlling angular accuracy.

The need has therefore been recognized for an optical sensing array and method of operation which can accurately control the acceptance angle of light beams and in which the control of angular accuracy can be maintained over a wide range of distance between the light transmitter and receiver elements. Despite the various types of optical sensing arrays in the prior art there has not yet been provided a suitable and attractive solution to these problems.

SUMMARY OF THE INVENTION

The present invention provides an optical sensing array system and method of operation for controlling the beam width and the acceptance angle of light beams which are strobed from light transmitters across parallel channels toward light receivers. The axes of the light beams in at least a pair of channels in the array are squinted relative to each other, and a control circuit compares the amplitudes of the signals from the light receivers associated with the pair of channels. An output signal is produced when the ratio of the amplitudes of the signals exceeds the ratio of predetermined high and low amplitude values. An autogain circuit controls the gain of the signals to remain within the range of the predetermined high and low amplitude values. Squinting of the light beams is provided in one embodiment by arranging at least one light transmitter element in offset relationship from the optical axis of the receiver element, in another embodiment by arranging at least one light receiver in offset relationship to the optical axis, in another embodiment by arranging beam-focusing lenses in offset positions, and in another embodiment by offsetting the apertures which form field stops for the beam-focusing lenses. In another embodiment both the light transmitter and receiver at least one of the channels. are squinted in opposite directions from the optical axis to produce a narrow effective beam width which minimizes the effects of spurious light reflections from the beams striking nearby objects.

The foregoing and additional objects and features of the invention will appear from the following specification in which the several embodiments have been set forth in detail in conjunction with the accompanying drawings.

BRIEF DESCRIPTION OF THE DRAWINGS

FIG. 1 is a perspective view illustrating an optical sense array in accordance with one embodiment of the invention.

FIG. 2 is a side elevation view of the light receiving bar for the sensing array shown in FIG. 1.

FIG. 3 is a schematic view, to an exaggerated scale, illustrating the intentional squinting of the light beam relative to the light receiver in one channel for the optical sensing array shown in FIG. 1.

FIG. 4 is a schematic diagram for the control circuit used in the optical sensing array of FIG. 1.

FIG. 5 is a graph illustrating the signal amplitude, measured by the control circuit of FIG. 5, as a function of squint angle for the light beams in a pair of the channels.

FIG. 6 is a graph illustrating the ratio of the high to low amplitudes as a function of squint angle for the two channels depicted in FIG. 5.

FIG. 7 is a side elevation view of a light transmitter bar in an optical sensing array according to another embodiment of the invention.

FIG. 8 is a graph similar to FIG. 5 showing light signal amplitudes as a function of squint angle for another embodiment in which the transmitter elements are squinted.

FIG. 9 is a schematic diagram illustrating a lens arrangement for providing intentional squinting of a light beam angle in accordance with another embodiment.

FIG. 10 is a schematic diagram illustrating an aperture arrangement which forms a field stop for providing intentional squinting of a light beam angle in accordance with another embodiment.

FIG. 11 is a circuit diagram for a control system in accordance with another embodiment of the invention.

FIG. 12 is a schematic view, to an exaggerated scale, illustrating an optical sensing array for the intentional squinting of both transmitter and receiver elements in accordance with another embodiment.

FIG. 13 is a graph illustrating a typical plot of the receiver signal amplitude as a function of transmitter squint angle, for the optical sensing array of FIG. 12.

FIG. 14 is a graph illustrating a typical plot of the receiver signal amplitude as a function of receiver squint angle for the optical sensing array of FIG. 12.

FIG. 15 is a graph illustrating the effective beam width as a function of receiver signal amplitude for the optical sensing array of FIG. 12.

DESCRIPTION OF THE PREFERRED EMBODIMENTS

In the drawings FIG. 1 illustrates generally at 12 an optical sensing array incorporating one embodiment of the invention. The optical sensing array provides a light curtain which includes a light transmitter 14 and light receiver 16. The transmitter and receiver are connected through cables 18, 20 to a control box 22 which contains components of the control circuit 24 shown schematically in FIG. 4.

Light transmitter 14 is comprised of a plurality of light sources, preferably LED's, not shown, which emit modulated, invisible pulses of infrared light beams 26 responsive to the control circuit In the illustrated embodiment the light beams are shown as being strobed in eight separate channels, although the number of channels in an end-use application would depend on the particular requirements and specifications. The LED's are mounted in spaced-apart relationship along a transmitter bar, not shown, which is fitted within a transmitter housing 28. The spacing or pitch between the LED's is predetermined and defines the space between the parallel channels along which the beams are directed toward the light receiver. The area encompassed by the beams defines the protected or guarded zone. The LED's are focused by suitable collimating lenses, not shown, into relatively narrow beams to minimize the effects of light scattering.

Light receiver 16 is comprised of a plurality, shown as eight, of light sensing elements 30–44 (FIG. 2). The light sensing elements comprise phototransistors (PT's), which are mounted in spaced-apart relationship along a receiver bar 46 which is fitted within a receiver housing 48. Preferably the number of light receiving PT's is equal to the number of light transmitting LED's, which each PT associated with the LED of a respective channel. At the work place the transmitter and receiver housings are installed so that the light curtain created by the light beams is between the machine or other equipment and the human operator or the like which is to be protected. Typically the transmitter and receiver housings are mounted upright in a vertical plane between the machine and operator, although other configurations could be employed, depending upon the requirements and conditions of a particular application.

While the operation of the embodiments of this invention will be described as incorporating infrared light, it is understood that the invention also contemplates the use of other radiant energy for the beams, for example near-infrared. It is also understood that the invention contemplates that a plurality of the transmitter/receiver pairs may be combined in tandem to protect a relatively larger zone or area.

The light strobing and pulse detection logic functions are controlled in each scanning cycle to sequentially strobe light beams in side-by-side channels with the scanning cycles iteratively repeated. The scanning logic control preferably comprises the multiplexer 94 (FIG. 4) which can be operated through a control circuit of the type shown in U.S. Pat. No. 4,266,124 to Weber. The scanning logic control could alternately be comprised of a shift register circuit of the type shown in U.S. Pat. No. 5,015,840 to Blau, assigned to Scientific Technologies Incorporated. The disclosures of the Weber and Blau patents are incorporated herein by this reference.

It is an important aspect of the invention that the light beam in at least one channel is directed toward the respective light receiver element along an axis which is squinted relative to the axis along which the light beam in at least one other channel is strobed. As shown in the schematic of FIG. 3, the beam strobed from transmitter element 50 toward receiver element 52 is directed along an axis 54 which is intentionally mispointed in offset relationship from the axis 56 of the beam that is strobed in at least one other channel in the array. The included angle between the beams 54 and 56 is squint angle φ, that is exaggerated in FIG. 4 for purposes of explanation. As used herein, the phrases "squinting," "squinted" and "squint angle" are intended to broadly include any non-coincidence of the light beam axis with the optical axis of the light receiver in each channel. The squinting is achieved in the desired channel by either offsetting the incident light beam from the optical axis of the light receiver, or by offsetting the light receiver optical axis from the light beam. Thus the squint angle is provided in different embodiments of the invention by means of offsetting the transmitter elements, by offsetting the receiver elements, by offsetting the focusing lenses or by offsetting apertures which form field stops in the lens system. The light beam in only one channel could be off set from the remaining non-offset channels to establish squint relationship, although any number of the channels in the array could have their respective light beams squinted.

In the embodiment of FIGS. 1 and 2 the squint angle is provided by intentionally offsetting each of the light receiver PT's 30-44. Light receiver bar 46 is comprised of a printed circuit (PC) board 58 to which the PT dies are directly attached. Each PT die is generally a rectangular shape with dimensions of approximately 10 mils on each side. In the illustrated embodiment eight PT dies are incorporated on the PC board in spaced-apart relationship along the PC board's longitudinal centerline 60. The number of PT's on each board can vary in accordance with the requirements and specifications of a particular application. The points at which the optical axes of the light beams impinge on the PC board are represented by the intersections of the plurality of reference lines 62-76 with centerline 60.

The squint angles between the four lowermost PT's 30-36 relative to the optical axes of the light beams in their respective channels are achieved by offsetting these PT's in alternate directions laterally of longitudinal centerline 60. In the illustrated embodiment this offset distance is approximately 3 mils from either side of the centerline, which is shown exaggerated for clarity in FIG. 2. Thus, PT 30 is offset to the left, as viewed in FIG. 2, along an axis 78 which is 3 mils from centerline 60 while its next adjacent PT 32 is offset along an axis 80 which is 3 mils to the right of the centerline. PT 34 is similarly offset 3 mils to the left while its next adjacent PT 36 is offset 3 mils to the right.

The squint angle can also be achieved by offsetting the PT's in alternate up and down relationship from the optical axes, as shown by the upper group of PT's 38-44. Thus, PT 38 is offset along an axis 82 which is approximately 3 mils below, as viewed in the figure, optical axis 70 while the next adjacent PT 40 is offset along an axis 84 approximately 3 mils above optical axis 72. Similarly, PT 42 is offset along an axis 86 approximately 3 mils below optical axis 74 while the upper PT 44 is offset along an axis 88 approximately 3 mils above optical axis 76. The invention contemplates that other offset positions could be employed. to provide the squint angles, for example the PT's or alternatively the LED's could be offset by being displaced to positions that are along an arc, e.g. 45°, between the longitudinal and transverse centerlines through the respective optical axis. The invention includes any combination of these offset relationships to provide the squint angles, for example, all of the PT or LED elements could be alternately offset left and right of centerline, or all could be alternately offset above and below the optical axes.

FIG. 4 illustrates schematically the control circuit 24 of the invention for controlling operation of the optical sensing array in the embodiment of FIGS. 1 and 2. The circuit 24 provides a window comparator function and an autogain control function. The autogain control ensures that the amplified signals from the PT's stay within range. In the diagram only one pair of adjacent PT's 42 and 44 and their associated circuit components are illustrated for purpose of clarity. The PT's respond to incident light of sufficient amplitude and produce signals, the gain of which is increased by preamplifiers 90 and 92 connected with each of the PT's. Signals from all of the preamplifiers are directed into a multiplexer 94 which produces an output signal into a variable gain amplifier 96 for each signal received from the preamplifiers. A control signal from a detect logic circuit 100 is input into the multiplexer at 98.

The multiplexer time-selects the channels for receiving the amplified PT output signals by scanning the channels in relation to the sequence in which the light transmitting LED's are activated. The gain of the multiplexer output is increased by variable gain amplifier 96, and the amplifier's output is directed into the positive input of a low detect comparator 102, the negative input of a high detect comparator 104 and the positive input of a regulator comparator 106. A predetermined voltage is applied to the negative input of comparator 106 to provide a reference signal $V_R$. The positive input of high detect comparator 104 is connected through a resistor divider circuit 108 with the negative input of the low detect comparator. Circuit 108 comprises resistors $R_1$ and $R_2$. The values of $R_1$ and $R_2$ are selected to establish a predetermined high amplitude $V_H$, which inputs into high detect comparator 104, and low amplitude value $V_L$, which inputs into low detect comparator 102. The ratio $V_H/V_L$ is equal to $$\frac{R_1 + R_2}{R_2}.$$

Assuming as an example that $R_1$=10K ohm and $R_2$=1K ohm then the ratio $V_H/V_L$=11/1. The resistors $R_1$ and $R_2$ could be replaced, as desired, by potentiometers for selectively adjusting the high-to-low threshold ratio $V_H/V_L$.

The outputs from the high and low detect comparators are directed into a detect logic circuit 100 which in turn generates a "safe out" or "condition unsafe" output signal which opens the circuits to the desired output relays 110, 112. When the output relays are opened they operate to either shut the system down, generate visual and/or audible alarm signals, or otherwise safeguard the protected area responsive to the control circuit. Logic circuit 100 also generates the "safe out" output signal whenever it senses that the beams are blocked, such as from penetration of an opaque object.

As a part of the autogain control, the output of regulator comparator 106 is directed through feedback loop 114 to set the gain of variable gain amplifier 96. The autogain control maintains the maximum amplitude of the signals around the $V_R$ level. The circuit examines the amplitudes of $V_1$, $V_2$ . . . $V_x$ of the signals after they are detected by the PT's in all of the channels and amplified during each cycle. If any of the amplitudes $V_1$, $V_2$ . . . $V_x$ are above $V_R$, then the signal from comparator 106 through loop 114 incrementally downranges the gain of amplifier 96 by a predetermined amount, such as 0.3 dB. If all of the amplitudes in the channels are below $V_R$ in any one scanning cycle, then the gain from amplifier 96 is incrementally upranged by a predetermined amount, such as 0.3 dB. By this means the highest channel signal hovers around $V_R$. Preferably $V_R$ is selected at a small value, such as 0.6 dB, below $V_H$. This circuit arrangement guarantees that, no matter how strong or weak the signals from the PT's are, the ratio $V_1/V_2$ of the strongest to the weakest channel amplitudes will never exceed $V_H/V_L$, otherwise the detect logic circuit operates to open relays 110, 112 for indicating an unsafe condition of the light curtain. Differing signal strengths, such as those caused by changes in transmitter-to-receiver distances, are nulled out of the circuit operation by the variable gain amplifier. In a typical light curtain operation the predetermined values can be set so that $V_H$=10 V, $V_L$=1 V and $V_R$=9.5 V.

The graph of FIG. 5 shows the effect of intentionally mispointing of the between the channels over a range of squint angles. Curve 116 plots the light amplitude signal in one channel as a function of squint angle while curve 118 plots the light amplitude for the signal in the other channel as a function of squint angle. In this example the beams for the two channels are mispointed so that the included angle between their axes, which is the predetermined squint angle, is approximately 2°, as shown by the distance 120 between their points of highest amplitude. With the axes of the light beams for these two channels arranged with this squint angle, the curves are offset so that one signal is larger than the other over the range of squint angles. Thus, the squint angles for all of the PT's would uniformly vary as the PT's are moved in unison, such as when the light receiver bar is tipped relative to the light beams. The squint angle at which the two curves cross is the angle at which the channel signals are the same, and at all other angles the signals from the two channels diverge in amplitude.

The amplitude ratio between the differently mispointed channels is measured and compared by components of circuit 24 that provide a window comparator function which enforces the maximum channel-to-channel gain ratio $V_H/V_L$ to output a "condition safe" signal from detect logic circuit 100. FIG. 6 graphs in curve 122 the signal ratio $V_1/V_2$ for the differently pointed channels represented by the amplitude signal curves of FIG. 5. As an example, with the window comparator function established so that the predetermined amplitude ratio $V_H/V_L$=3/1, represented by the line 124, then curve 122 shows that this channel ratio is exceeded when the squint angle is above about a 2.5° included angle. At this point the control circuit determines that the signal ratio $V_1/V_2$>$V_H/V_L$ to produce the output signal through detect logic circuit 100 for operating relays 110 and 112. As a result, any mispointing of the light receiver bar beyond the minimum acceptable 2.5° angle is detected so that the output from the circuit represents a "condition unsafe" signal.

An important advantage of the invention is that by knowing the intentional squint angle, and by knowing the high and low window threshold $V_H/V_L$, then the angle over which the light curtain can be mispointed and still operate can be determined and controlled irrespective of the range between the transmitter and receiver bars. The control system of the invention can detect changes in mispointing of either the transmitter or receiver bars by measuring the amplitude ratio $V_1/V_2$ and does not depend upon measuring absolute signal level. If the measured ratio $V_1/V_2$ exceeds the predetermined ratio $V_H/V_L$, which can be selectively varied by changing the upper and lower thresholds, then it is possible to easily determine the maximum mispointed angle beyond which the light curtain will not operate. This makes it possible to construct and install a light curtain which will operate, with a high degree of certainty, within a predetermined squint angle, such as the 2½° maximum permissible angle specified by the laws of certain countries.

FIG. 7 illustrates another embodiment providing an alternate arrangement for producing the squint angle by means of a light transmitter bar 126 in which only one of the light transmitting elements or LED's is intentionally mispointed from the remaining LED's. A plurality of the LED's 126–140 are mounted on a PC board 142 which is fitted in the transmitter bar housing. The LED's are spaced apart along the longitudinal axis 144 of the transmitter bar with the LED 126 offset along an axis 146 from one side of axis 144 by a predetermined distance, e.g. 3 mils. With this configuration the axis of the light beam strobed by LED 126 is intercepted by the light receiver element, not shown, in the respective channel at a position which is offset from the optical axis of the LED's in the remaining channels. Other arrangements could be employed for mispointing the LED's to produce the desired squint angle, such as positioning the LED's in adjacent channels in alternate up and down relationship, along the length of longitudinal axes, from the optical axes of the respective PT's. A combination of alternate left and right or up and down displacement of the LED's relative to the PT optical axes could also be employed.

A control circuit similar to that explained in connection with FIG. 4 is provided for operating the optical sensing array employing the light transmitter bar of FIG. 7. The graph of FIG. 8 depicts curves 148, 150 which represent the respective signal amplitudes $V_1$ and $V_2$ as a function of squint angle between the beam from LED 126 and the optical axes of the remaining LED's. In this example the light transmitter LED's are positioned so that the full included angle of squint produced by this offset is substantially 2°.

FIG. 9 schematically illustrates another embodiment providing an alternate arrangement for producing the squint angle by offsetting the lens 152 in a beam focusing lens system 154. For each LED 156 in the light transmitter bar a lens 152 is mounted in the channel for focusing the strobed light beam toward a respective PT 158 which is mounted in receiver bar 160. The lenses in adjacent channels are offset in alternate directions a predetermined distance from the optical axis 162 between the LED's and PT's. This causes the center of the beam to intercept the plane of PT 158 at a predetermined offset distance from the axis 162. The predetermined offset distance can be on the order of 3 mils, and that offset is shown exaggerated in FIG. 9 for purpose of clarity. A control system similar to that explained in connection with FIG. 4 operates the optical sensing array employing the lens focusing system of FIG. 9.

FIG. 10 schematically illustrates another embodiment providing an alternate arrangement for producing the squint angle employing offset of the field stops 164 in a beam focusing system 166. LED's 168 in a light transmitter bar strobe light beams along parallel channels toward an opaque screen 170 which is formed with a plurality of apertures 172 (only one is shown), which are circular. Each aperture is associated with a respective light beam channel. On the opposite side of each aperture a lens 174 is mounted at a distance where the aperture forms the field stop for the lens. The image of LED 168, when it is strobing light, which appears in the aperture is focused by the lens and directed along an axis toward PT 176 for that channel in light receiver bar 178. The apertures for adjacent channels are offset alternately on opposite sides of the optical axis 180 extending through the centerline of the PT's. This offset of the apertures causes the focused beams to intercept the plane of the PT's at positions which are alternately offset from the optical axes of the PT's. As a result the focused beams produce the squint angle which is employed in operating optical sensing array incorporating a control circuit similar to that described for FIG. 4. The invention also encompasses field stop apertures which are elongated (e.g. ellipses) in the direction of desired squirtting. The elongated apertures will produce the squint effect in a manner similar to offsetting the circular apertures.

FIG. 11 illustrates another embodiment providing an alternate window comparator circuit for measuring the ratio $V_1/V_2$ and comparing it to the predetermined window threshold ratio $V_H/V_L$. The circuit 182 would be used in place of the circuitry which includes the variable gain amplifier and comparator circuitry in the control circuit of FIG. 4. Signals from the series of PT's 184, 186 in the light receiver bar are directed through preamplifiers 188, 190 and into multiplexer 192. The multiplexer time-selects the appropriate channel when the LED's are; strobed in each scanning cycle. The signals are then directed into an AD converter 194. The converted digital signal is then directed into a microprocessor 196 of a conventional type which converts $V_1$ and $V_2$ into respective logarithmic values $Log_1$ and $Log_2$. The microprocessor is also controlled to establish predetermined logarithmic values $Log_H$ and $Log_L$ which respectively represent the upper and lower signal threshold levels. Microprocessor 196 is further programmed to compute the difference between the high and low channels $V_1$ and $V_2$ by computing the value $X=Log_1-Log_2$. The microprocessor further computes the value $Y=Log_H-Log_L$, and the ratios are compared by measuring the difference between the values X and Y. When the microprocessor detects that X>Y, a control signal is input into detect logic circuit 198 which outputs a "condition unsafe" signal for operating the relays 200, 202 as in the embodiment of FIGS. 1–4.

FIGS. 12–15 illustrate another embodiment providing an optical sensing array 204 which achieves a relatively narrow effective beam width. FIG. 12 shows schematically a light transmitter 206 which strobes a light beam 208 into lens 210 which focuses the beam toward a light receiver 212. While lens 210 is illustrated as a single lens, it could comprise a compound lens system for focusing the beam, as desired. In this embodiment both the light transmitter and receiver are squinted in opposite directions from the channel's optical axis 214. Transmitter 206 is squinted by being offset a predetermined distance, e.g. 3 mil, on one side of axis 214 while the receiver is squinted by being offset a predetermined distance to the opposite side of the axis. An effective equivalent to this squinting of the transmitter could also be achieved by centering the transmitter on the optical axis while offsetting the lens system in an appropriate direction from the axis which causes the beam to focus on a region of the receiver which is offset in the manner shown for the embodiment of FIG. 9. A similar squinting effect could be achieved by employing an aperture forming a field stop which is offset in the manner described for the embodiment of FIG. 10.

In a typical installation employing multiple light beams, it is preferred that the light transmitters and receivers in each of the channels are squinted in opposite directions. A control circuit, not shown, of the type described in connection with FIG. 4 is provided for operating optical sensing array 204. As the light beam in each channel is strobed from the squinted transmitter it is focused by lens 210 along an axis toward the oppositely squinted receiver. The graph of FIG. 13 illustrates by the curve 216 a typical relationship between the receiver signal amplitude as a function of transmitter squint angle where the receiver is not squinted. FIG. 14 illustrates by the curve 218 a typical relationship between the receiver signal amplitude as a function of receiver squint angle where the transmitter is not squinted. In this embodiment where both the transmitter and receiver are squinted in opposite directions, the combination signal pattern is produced as shown by curve 220 in the graph of FIG. 15 which plots receiver signal amplitude as a function of angle from the optical axis. The graph illustrates that a relatively narrow effective beam width is produced as compared to the graphs of FIGS. 13 and 14 in which only the transmitter or receiver are squinted.

The narrow beam width produced by optical sensing array 204 makes the light curtain less prone to sensing spurious light reflections. An object which is brought in to an off-axis position near the beam can reflect a portion of the light because of the beam width and beam spreading. The dual squinting arrangement of this embodiment improves the rejection of such off-axis spurious reflections because the receiver receives less signal from the spurious reflection than if the light beam were directly aligned with the axis of the receiver.

The invention also contemplates an optical sensing array in which the oppositely directed squinting of the transmitter and receiver in each channel is combined with the squinting relationship described for FIGS. 1–6 in which the axis of the light beam in at least one channel is squinted relative to the axis of the light beam in at least one other channel. Such an array would provide for operation of the light curtain to produce a narrow effective beam width for minimizing the effect of spurious light reflections while also controlling the acceptance angle.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method of operating an optical sensing array in which light beams are strobed from a plurality of light transmitters in side-by-side channels toward a plurality of light receivers which are associated with respective channels and are adapted to sense the light beams for producing output signals, and in which an optical axis extends between the transmitter and receiver of each channel, the method comprising the steps of squinting the light beam being strobed from the light transmitter in at least one of the channels on one side of said optical axis, squinting the light receiver in said one channel on a side of said optical axis which is opposite said one side and producing an output signal responsive to light being received by the light receiver.

2. A method as in claim 1 in which the step of squinting the light beam being strobed from the light transmitter is carried out by offsetting the light transmitter at a predetermined distance from and in a given direction from the optical axis in said one channel, and the step of squinting the light receiver is carried out by offsetting the light receiver a predetermined distance from and in a direction which is substantially opposite said given direction.

3. In an optical system in which light beams are strobed from a plurality of light transmitters in side-by-side channels toward a plurality of light receivers which are associated with respective channels and are adapted to sense the light beams for producing output signals, and in which an optical axis extends between the transmitter and receiver of each channel, an optical sensing array comprising the combination of light transmitter means having a light transmitter in each channel for strobing the light beam, light receiver means having a light receiver in each channel for sensing light, first squinting means for squinting the light beam being strobed from the light transmitter in at least one of the channels in a first direction on one side of said optical axis, second squinting means for squinting the light receiver associated with said one channel in a second direction on a side of said optical axis which is opposite said one side, and means for producing an output signal responsive to the sensing of light by said light receiver means.

4. An optical sensing array as in claim 3 in which first squinting means includes means for offsetting the light transmitter at a predetermined distance from and in a given direction from the optical axis in said one channel, and said second squinting means includes means for offsetting the light receiver a predetermined distance from and in a direction which is substantially opposite said given direction in said one channel.

5. A method of operating an optical sensing array for controlling the acceptance angle of light beams which are iteratively strobed in cycles from a plurality of light transmitters in side-by-side channels toward a plurality of light receivers which are associated with respective channels and are adapted to sense the light beams for producing signals, and in which an optical axis extends between the transmitter and receiver in the channels, the method comprising the steps of directing the light beam in a first one of the channels along a first axis which is squinted relative to a second axis along which the light beam in at least a second one of the channels is strobed, squinting the light beam being strobed from the transmitter in at least a selected channel on one side of said optical axis, squinting the light receiver in said selected channel on a side of said optical axis which is opposite said one side, producing a signal $V_1$ responsive to light being sensed by the light receiver associated with the first channel, producing a signal $V_2$ responsive to light being sensed by the light receiver associated with the second channel, establishing a predetermined high amplitude value $V_H$, establishing a predetermined low amplitude value $V_L$ which is below $V_H$, comparing the ratio $V_1/V_2$ to a ratio $V_H/V_L$, and producing an output signal responsive to $V_1/V_2 > V_H/V_L$.

6. An optical sensing array system for controlling the acceptance angle of light beams, the system comprising the combination of a light transmitter having a plurality of light transmitter elements, a light receiver having a plurality of light receiving elements which are arrayed across a protected zone from respective ones of the light transmitter elements, means for iteratively strobing light beams from the light transmitter elements in side-by-side channels toward the light receiver elements, each channel including an optical axis extending between the light transmitter and receiver elements, beam squinting means for causing the light beam in a first one of the channels to be directed toward the respective light receiving element in the first channel along a first axis which is squinted relative to a second axis along which the light beam in at least a second one of the channels is strobed, said beam squinting means including first squinting means for squinting the light beam being strobed from the light transmitter and at least a selected one of the channels in a first direction on one side of said optical axis and second squinting means for squinting the light receiver element associated with said selected channel in a second direction on a side of said optical axis which is opposite said first side, means for producing a signal $V_1$ responsive to light being sensed by the light receiver element of the first channel, means for producing a signal $V_2$ responsive to light being sensed by the light receiver element of the second channel, means for establishing a predetermined high amplitude value $V_H$ and a predetermined low amplitude value $V_L$ which is below $V_H$, means for comparing the ratio $V_1/V_2$ to the ratio $V_H/V_L$, and means for producing an output signal responsive to $V_1/V_2 > V_H/V_L$.

* * * * *